Oct. 1, 1940.　　　　J. ROMP　　　　2,216,652
METHOD OF MAKING WIRE-DRAWING DIES
Filed June 15, 1936

INVENTOR
JOHAN ROMP
By
ATTORNEY.

Patented Oct. 1, 1940

2,216,652

UNITED STATES PATENT OFFICE 2,216,652

METHOD OF MAKING WIRE-DRAWING DIES

Johan Romp, Eindhoven, Netherlands, assignor, by mesne assignments, to Hartford National Bank and Trust Company, as trustee, Hartford, Conn.

Application June 15, 1936, Serial No. 85,422
In Germany March 11, 1936

2 Claims. (Cl. 76—107)

My invention relates to a method of setting diamonds in diamond wire-drawing dies.

In setting diamonds in wire-drawing dies, it is known to surround the diamond with a powdered mass and then apply heat and pressure to solidify the mass and to form a solid assembly. Such methods, however, have the disadvantage that it is very difficult to give the diamond a desired position within the assembly. More particularly the diamond may be incorrectly positioned within the assembly with respect to its shape, or may be eccentric with regard to the assembly. This causes considerable difficulty, particularly when a bore must be provided at a definite spot in the diamond and in a definite direction.

The object of my invention is to overcome the above difficulties by providing a method of setting whereby the diamond will have a definite and predetermined position with regard to the completed assembly.

In accordance with my invention, instead of completely surrounding the diamond with a powdered mass I place the diamond upon a plate or support, and subsequently surround its exposed surface with a powdered material capable of being sintered, after which I apply heat and pressure to sinter the material and to form a solid assembly. As a rule I prefer to provide the diamond with a flat supporting face to readily position same on the supporting plate.

In a preferred embodiment of my invention, I form the plate or support from a material to which plate or support the powdered material is sintered when subjected to heating and pressing, and forms therewith a single solid body. The plate thereby may also be made by sintering into a plate the same material as is used for the powdered material.

Diamonds set in accordance with the present invention always assume the desired position with respect to the completed assembly, and thus the subsequent boring of a passageway may be readily and accurately effected. Futhermore, as the diamond retains its fixed position during the setting operation, the bore may be drilled before the setting.

In order that my invention may be clearly understood and readily carried into effect, I shall describe the same more fully with reference to the accompanying drawing, in which.

Figure 1:
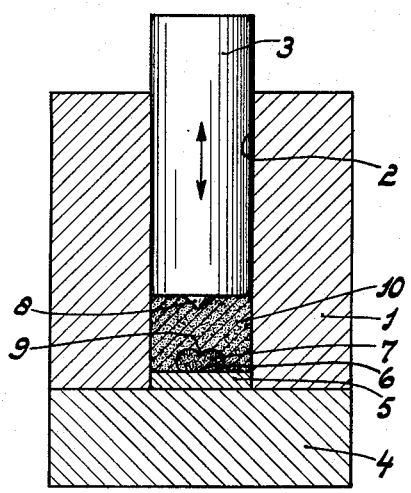
Figure 1 is a sectionized view of a mold suitable for carrying out the method of the present invention.
Figure 2:
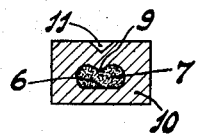
Figure 2 is a sectional view of a diamond, set according to the invention.
Figure 3:
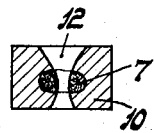
Figure 3 is a sectional view of a diamond die in accordance with the present invention.

The mold shown in Figure 1 comprises an annular portion 1 provided with a cylindrical cavity 2 having its bottom end closed by means of a base 4; the portion 1 and base 4 being of a refractory material such as carbon or zirconia. Snugly fitting in the cavity 2 and adapted to be moved in the direction of the double-headed arrow is a pressing plunger 3.

Snugly fitting within the bottom of cavity 2 and resting upon the base 4 is a plate or support 5 upon which is placed a diamond 7 provided with a flat face 6.

For the proper centering of the diamond it is preferable to provide the diamond with a conical cavity 9 and for facilitating the boring process it is preferred to provide the plunger 3 with a conical end 8.

Within the cavity 2 and surrounding the remaining portion of the diamond is a suitable quantity of a powdered material 10 capable of being sintered. The material 10 may be a mixture which by sintering heating forms a so-called hard-metal alloy, for example a mixture of tungsten carbide together with several per cents, by weight of cobalt, or a mixture consisting of tungsten or molybdenum powder together with several per cents by weight of nickel. For example, a mixture of about 95% tungsten carbide and about 5% cobalt, or a mixture of about 95% tungsten and 5% nickel.

The plate 5 may be of a refractory material. However in cases in which it is desired to enclose the diamond within the setting material I make the plate 5 from a material which by the pressing and sintering heating forms an assembly with the material 10. Preferably the plate 5 is formed by sintering the same materials as used in the mass 10.

To set the diamond, plunger 3 is pressed downwards under a pressure of about 350 pounds per square inch while heating the mold to a temperature of from 1300 to 1500° C., whereby plate 5, diamond 7, and mass 10 unite into a solid assembly.

The diamond may then be drilled with a bore normal to the face 6 whereby the cavity 11 formed by the conical end 8 serves to indicate the correct spot for drilling.

While I have described my invention in connection with specific examples and applications, I do not wish to be limited thereto but desire the appended claims to be construed as broadly as permissible in view of the prior art.

What I claim is:

1. A method of setting a diamond for a wire-drawing die, comprising the steps, pressing and sintering a powdery metallic material to form a solid supporting plate, placing the plate within a cavity of a mold, providing the diamond with a flat surface at one side and with a centering cavity at the opposite side, locating the diamond in a desired position on the plate with its flat surface in contact with the surface thereof, filling the cavity with a quantity of the unsintered powdery material sufficient to surround the remaining portion of the diamond, applying heat and pressure to compact the surrounding material and to sinter the material and plate into one solid assembly, and providing the assembly with a bore perpendicular to the flat surface.

2. A method of setting a diamond for a wire-drawing die, comprising the steps, pressing and sintering a powdery metallic material to form a solid supporting plate, placing the plate within a cavity of a mold, providing the diamond with a flat surface and with a bore perpendicular thereto, locating the diamond in a desired position on the plate with its flat surface in contact with the surface thereof, filling the cavity of the mold with a quantity of the unsintered powdery material sufficient to surround the remaining portion of the diamond, and applying heat and pressure to compact the surrounding material tightly around the diamond and to sinter the surrounding material and the supporting plate into one solid assembly.

JOHAN ROMP.